(12) United States Patent
Gong et al.

(10) Patent No.: US 11,673,192 B2
(45) Date of Patent: Jun. 13, 2023

(54) METHOD FOR CALIBRATING INTERNAL TEMPERATURE FIELD OF AMORPHOUS ALLOY PREPARED BY SPARK PLASMA SINTERING

(71) Applicant: HUAZHONG UNIVERSITY OF SCIENCE AND TECHNOLOGY, Hubei (CN)

(72) Inventors: Pan Gong, Hubei (CN); Huaping Ding, Hubei (CN); Xinyun Wang, Hubei (CN); Junsong Jin, Hubei (CN); Lei Deng, Hubei (CN); Mao Zhang, Hubei (CN); Xuefeng Tang, Hubei (CN)

(73) Assignee: HUAZHONG UNIVERSITY OF SCIENCE AND TECHNOLOGY, Hubei (CN)

( * ) Notice: Subject to any disclaimer, the term of this patent is extended or adjusted under 35 U.S.C. 154(b) by 10 days.

(21) Appl. No.: 17/616,199

(22) PCT Filed: Apr. 6, 2021

(86) PCT No.: PCT/CN2021/085524
§ 371 (c)(1),
(2) Date: Dec. 3, 2021

(87) PCT Pub. No.: WO2022/160465
PCT Pub. Date: Aug. 4, 2022

(65) Prior Publication Data
US 2023/0038974 A1    Feb. 9, 2023

(30) Foreign Application Priority Data
Jan. 31, 2021  (CN) .................. 202110134598.3

(51) Int. Cl.
*B22F 3/24* (2006.01)
*B22F 3/00* (2021.01)
*B22F 3/105* (2006.01)

(52) U.S. Cl.
CPC .............. *B22F 3/24* (2013.01); *B22F 3/006* (2013.01); *B22F 3/105* (2013.01);
(Continued)

(58) Field of Classification Search
CPC .................................. B22F 3/24; B22F 3/006
(Continued)

(56) References Cited

FOREIGN PATENT DOCUMENTS

| CN | 101158607 | | 4/2008 |
| CN | 101158607 A | * | 4/2008 |

(Continued)

OTHER PUBLICATIONS

K Matsugi et al., "Temperature Distribution at Steady State Under Constant Current Discharge in Spark Sintering Process of Ti and Al2O3 Powders," Journal of Materials Processing Technology, vol. 134, Issue 2, Mar. 2003, pp. 1-17.
Cao Wang et al., "FEM analysis of the temperature and stress distribution in spark plasma sintering: Modelling and experimental validation," Computational Materials Science, vol. 49, Issue 2, Aug. 2010, pp. 351-362.
"International Search Report (Form PCT/ISA/210) of PCT/CN2021/085524," dated Nov. 1, 2021, pp. 1-4.
(Continued)

*Primary Examiner* — Weiping Zhu
(74) *Attorney, Agent, or Firm* — JCIP Global Inc.

(57) ABSTRACT

The invention belongs to the field of amorphous alloys, and more specifically, relates to a method for calibrating the internal temperature field of amorphous alloy prepared by spark plasma sintering. First, the part required for temperature field calibration inside the bulk amorphous alloy sample obtained by spark plasma sintering is cut into a series of small amorphous alloy samples, and the isothermal crystallization treatment is performed to obtain the crystallization time of different parts of the sample. An annealing-isothermal crystallization experiment is performed on the adopted amorphous alloy powder at different annealing temperatures, and the functional relationship between the annealing temperature and the crystallization time is obtained. The
(Continued)

crystallization time of different parts inside the amorphous alloy sample is substituted into this functional relationship, the temperature distribution during the temperature holding stage during the sintering of different parts inside the amorphous alloy sample can be obtained.

10 Claims, 7 Drawing Sheets

(52) U.S. Cl.
CPC . *B22F 2003/1051* (2013.01); *B22F 2003/248* (2013.01); *B22F 2203/11* (2013.01); *B22F 2998/10* (2013.01)

(58) Field of Classification Search
USPC .......................................................... 419/29
See application file for complete search history.

(56) References Cited

FOREIGN PATENT DOCUMENTS

| | | | |
|---|---|---|---|
| CN | 103726434 | | 4/2014 |
| CN | 104390999 | | 3/2015 |
| CN | 105039761 | | 11/2015 |
| CN | 109001245 | | 12/2018 |
| CN | 111257360 | | 6/2020 |
| CN | 111299584 | | 6/2020 |
| CN | 111753452 | | 10/2020 |
| CN | 111753452 A | * | 10/2020 |
| JP | 2006228378 | | 8/2006 |

OTHER PUBLICATIONS

"Written Opinion of the International Searching Authority (Form PCT/ISA/237) of PCT/CN2021/085524," dated Nov. 1, 2021, pp. 1-3.

* cited by examiner

METHOD FOR CALIBRATING INTERNAL TEMPERATURE FIELD OF AMORPHOUS ALLOY PREPARED BY SPARK PLASMA SINTERING

CROSS-REFERENCE TO RELATED APPLICATION

This application is a 371 of international application of PCT application serial no. PCT/CN2021/085524, filed on Apr. 6, 2021, which claims the priority benefit of China application no. 202110134598.3, filed on Jan. 31, 2021. The entirety of each of the above mentioned patent applications is hereby incorporated by reference herein and made a part of this specification.

FIELD OF THE DISCLOSURE

The disclosure belongs to the field of amorphous alloys, and more specifically relates to a method for calibrating the internal temperature field of amorphous alloy prepared by spark plasma sintering.

DESCRIPTION OF RELATED ART

With long-range disordered and short-range ordered atomic structure, amorphous alloys do not have dislocations and grain boundaries that are common in conventional crystalline alloys. Therefore, amorphous alloys have better mechanical properties, physical properties and chemical properties, etc. than conventional alloy materials, and therefore amorphous alloys are of great values for research and applications. However, the conventional preparation technology of amorphous alloy is mainly based on the principle of high-temperature melt quenching. Limited by the cooling rate of the amorphous alloy itself, only powdered, filament-like or film-like amorphous alloys can be prepared, and the size limitation considerably restricts the application of amorphous alloys. The powder sintering technology to sinter amorphous powders can significantly break the size limit of amorphous alloys, thereby preparing large-sized amorphous alloy. Among many powder sintering technologies, spark plasma sintering (SPS) technology is particularly suitable for the preparation of amorphous alloys because of its low sintering temperature and fast sintering speed.

However, due to the fast heating rate of SPS, when sintering large-sized or complex-shaped amorphous alloy samples, a non-uniform temperature field will inevitably be generated inside the sample. Since amorphous alloys are highly sensitive to temperature, local crystallization will be caused by high local temperature, which will significantly affect the internal structure and properties of the sintered sample. Carrying out research on the temperature distribution within the sample sintered by SPS technology is of great significance in understanding and solving the problem of non-uniform internal structure and properties of the SPSed samples.

Currently, research methods for studying temperature field during SPS are mainly categorized into numerical simulation and experimental methods. There are many studies on the numerical simulation of temperature field during SPS, but the simulation results need to be verified by experimental results. At present, there are few research methods for studying the temperature field during SPS through experimental methods. There are mainly two experimental methods involved. The literature "Temperature distribution at steady state under constant current discharge in spark sintering process of Ti and $Al_2O_3$ powders" provides a temperature field research method that directly measures the temperature values of the parts where thermocouples are disposed at different positions in the SPS sintering system. The literature "FEM analysis of the temperature and stress distribution in spark plasma sintering: Modelling and experimental validation" indirectly studies the difference in sintering temperature by observing the microstructure of different parts of the section of the sintered sample. However, the above two methods have their shortcomings. For the measurement method by using thermocouples, it is easy to set a thermocouple at the die, punch, or spacer of the sintering system, but it is difficult to set a thermocouple inside the powdered sample or only one thermocouple can be set. Under the circumstances, the overall temperature distribution of the sample cannot be obtained. In addition, the configuration of arranging thermocouple in a sample involves drilling the sintering die and other modification processes, which is very troublesome. Besides, the modified die cannot be used for conventional SPS, and the built-in thermocouple will affect the actual distribution of sintering temperature field of the sample due to heat conduction and other factors. Under the circumstances, the accurate temperature value of the sample cannot be obtained. The observation of the microstructure of the sample mainly involves observation of the grain size at different parts of the section of the sintered sample, or the phase transition process, which is not suitable for amorphous alloys with no grains and obvious phase transition process. Therefore, the observation method can only be adopted to qualitatively analyze the temperature distribution inside the sample, and cannot obtain the numerical distribution of the sintering temperature field. Moreover, the microstructure of the sample is also affected by other factors other than temperature. Therefore, the temperature distribution trend analyzed by using the microstructure observation method is not accurate. Furthermore, in order to observe the microstructure at different positions of the section of sample, a grinding step, a corrosion step, and microscope observation are required, which is cumbersome and requires a lot of experimental work.

SUMMARY OF THE DISCLOSURE

In view of the shortcomings of the conventional technology, the purpose of the disclosure is to provide a simple and accurate method for calibrating the internal temperature field of amorphous alloy prepared by spark plasma sintering, which aims to solve the following problems in conventional technologies, namely experimental method for verification is required in calibrating the internal temperature distribution of SPS sintered samples through numerical simulation; using conventional experimental method to calibrate the internal temperature distribution of SPSed samples affects the internal temperature distribution of the sintered sample, the steps of the method are complicated and the calibration accuracy needs to be improved.

In order to achieve the above purpose, the disclosure provides a method for calibrating the internal temperature field of an amorphous alloy prepared by spark plasma sintering, which includes the following steps:

(1) Amorphous alloy powder is sintered by spark plasma sintering to obtain bulk amorphous alloy samples.

(2) The part of the bulk amorphous alloy sample obtained in step (1) with temperature field that needs to be calibrated is cut into a number of amorphous alloy sub-blocks, and the position of each amorphous alloy sub-block in the bulk amorphous alloy sample is marked.

(3) The several amorphous alloy sub-blocks obtained in step (2) are respectively subjected to isothermal crystallization treatment at the same holding temperature to obtain the crystallization time of each amorphous alloy sub-block. The holding temperature is in the supercooled liquid region of the amorphous alloy.

(4) Annealing and isothermal crystallization are performed on the amorphous alloy powder used in the preparation of the bulk amorphous alloy sample at different annealing temperatures, so as to obtain the corresponding crystallization time of the amorphous alloy powder at different annealing temperatures, that is, to obtain the functional relationship between the annealing temperature and the crystallization time of the amorphous alloy powder. Moreover, in step (4), the holding temperature in performing isothermal crystallization on the amorphous alloy powder is the same as the holding temperature in performing isothermal crystallization on the amorphous alloy sub-blocks in step (3).

(5) The crystallization time of several amorphous alloy sub-blocks obtained in step (3) is substituted into the functional relationship between annealing temperature and crystallization time in step (4), then the temperature distribution of different amorphous alloy sub-blocks corresponding to different positions inside the bulk amorphous alloy sample during the spark plasma heat preservation sintering process can be obtained.

Preferably, step (1) specifically includes: the amorphous alloy powder is placed in a sintering die, the amorphous alloy powder is pressed into a green body, and then placed in a spark plasma sintering furnace to be heated to a sintering temperature. The sintering temperature is in the supercooled liquid region of the amorphous alloy, the temperature is cooled to room temperature after the sintering is completed, and a bulk amorphous alloy sample is obtained.

Preferably, the heating rate is 50 to 150 K/min, and the holding time is 3 to 10 minutes.

Preferably, step (2) adopts mechanical cutting or wire electrical discharge machining (WEDM). The three-dimensional size of the amorphous alloy sub-block is no larger than 2 mm×2 mm×2 mm.

Preferably, in step (3), the several amorphous alloy sub-blocks are respectively subjected to isothermal crystallization treatment according to the DSC principle to obtain the crystallization time of each amorphous alloy sub-block.

Preferably, in step (3), a differential scanning calorimeter is used to perform isothermal crystallization treatment on the amorphous alloy sub-block.

Preferably, step (3) is specifically as follows. Several amorphous alloy sub-blocks cut in step (2) are respectively heated to the same holding temperature $T_{holding\ temperature}$. The amorphous alloy sub-blocks are kept at the holding temperature until the amorphous alloy sub-blocks are completely crystallized, so as to obtain a number of isothermal DSC heat flow curves corresponding to the several amorphous alloy sub-blocks at the holding temperature. Each of the heat flow curves is adopted to obtain the initial crystallization time of each amorphous alloy sub-block as its crystallization time. The holding temperature $T_{holding\ temperature}$ is in the supercooled liquid region $\Delta T$ of the amorphous alloy.

Preferably, the initial crystallization time $t_{crystallization}$ is calibrated on the DSC heat flow curve by using the double tangent method, and the specific method is as follows. Tangents are made respectively at the smooth baseline on the heat flow curve where crystallization has not occurred yet and at the descending part of the crystallization peak at the beginning of crystallization. The time corresponding to the intersection of the two tangents is the initial crystallization time $t_{crystallization}$, and finally the initial crystallization time $t_{crystallization}$ of each amorphous alloy sub-block at different positions inside the amorphous alloy sample is obtained. The initial crystallization time is taken as the crystallization time.

Preferably, step (4) includes the following sub-steps.

(4-1) The amorphous alloy powder is heated to the annealing temperature at the heating rate of the spark plasma sintering described in step (1), and then holds the temperature. The holding time is the same as that of the spark plasma sintering described in step (1), cooling is performed after annealing, and the cooling rate is the same as that after spark plasma sintering in step (1). The annealing temperature is in the supercooled liquid region of the amorphous alloy.

(4-2) After the temperature is cooled to a value below 100° C., the obtained amorphous alloy is subjected to isothermal crystallization treatment. The holding temperature in performing the isothermal crystallization is the same as the holding temperature in performing the isothermal crystallization on the amorphous alloy sub-block in step (3), and the temperature is kept until the amorphous alloy is completely crystallized, and the corresponding crystallization time at the annealing temperature is obtained.

(4-3) The annealing temperature is changed within the supercooled liquid region of the amorphous alloy, and steps (4-1) and (4-2) are repeated to obtain the corresponding crystallization time at different annealing temperatures, that is, to obtain the functional relationship between the annealing temperature and the crystallization time of the amorphous alloy powder material.

Preferably, the crystallization time data corresponding to different annealing temperatures obtained in step (4-3) is nonlinearly fitted to obtain the functional relationship between the annealing temperature and the crystallization time.

Generally speaking, compared with the conventional technology, the above technical solutions conceived by the disclosure have the following advantageous effects.

(1) The disclosure provides an experimental method for calibrating the internal temperature field of amorphous alloy prepared by SPS. The principle of this method is mainly to use the characteristics of the crystallization process of the amorphous alloy at high temperature, and obtain the crystallization time of each part inside the amorphous alloy sample prepared by SPS through the isothermal crystallization experiment. On the other hand, the amorphous alloy powder used for preparing the sintered sample is subjected to annealing experiments at different annealing temperatures, and then isothermal crystallization experiments are performed on the annealed samples to obtain the crystallization time corresponding to different annealing temperatures, so as to construct the functional relationship between the crystallization time and the annealing temperature. Thereafter, according to the crystallization time of different parts obtained according to the isothermal crystallization experiment performed on the sintered sample, the internal temperature field distribution of the amorphous alloy prepared by SPS. The method provided by the disclosure does not affect the temperature distribution inside the sample during SPS, and indirect temperature calibration is performed through the crystallization time of the amorphous material at high temperature, and the sintering temperature of different parts inside the sintered sample can be accurately obtained.

(2) The method for calibrating the internal temperature field of amorphous alloy prepared by SPS provided in the disclosure is based on the material characteristics of amorphous alloy, which is a new type of material. First, an amorphous alloy sample is formed by SPS, and different parts in the sample are cut and sampled in an array, and the crystallization time of different parts inside the sample is obtained by isothermal crystallization. Then, the crystallization time data is substituted into the function relationship between different annealing temperature and crystallization time constructed by annealing-isothermal crystallization experiment, thereby obtaining the temperature field distribution inside the amorphous alloy sample prepared by SPS. Through this method, the sintering temperature of any part inside the amorphous alloy sintered sample can be obtained indirectly, which has a high level of conformity with the simulating results and high applicability.

(3) Compared with the conventional thermocouple method, the disclosure does not need to insert a thermocouple inside the sample, and will not affect the sintering temperature distribution of the sample. Moreover, unlike the thermocouple method, the disclosure does not require drilling and other processing of the sintering die. The process is simple, and temperature information can be obtained from more positions, so that a specific overall distribution of the internal temperature field of the amorphous alloy sample prepared by SPS can be constructed. In both of the microstructure analysis method and present disclosure, the temperature field is studied in an indirect way, but the present disclosure can directly obtain the numerical distribution of the temperature field, whereas the microstructure analysis method can only perform qualitative analysis. Moreover, in order to observe the microstructure at different positions of the section of the sample, a cutting step, a grinding step, a corrosion step, and electron microscope observation are required, and the process is cumbersome. After constructing the relationship between the crystallization time and the annealing temperature in the disclosure, the sintering temperature of the part can be obtained as long as the crystallization time of the different parts inside the amorphous alloy is obtained. Furthermore, the microstructure observation method is not suitable for amorphous alloys with no grains and obvious phase transition process.

DESCRIPTION OF EMBODIMENTS

In order to make the purpose, technical solutions, and advantages of the present disclosure clearer, the following further describes the present disclosure in detail with reference to the accompanying drawings and embodiments. It should be understood that the specific embodiments described here are only used to explain the present disclosure, but not to limit the present disclosure.

The method for calibrating the internal temperature field of an amorphous alloy prepared by spark plasma sintering (SPS) provided by the disclosure includes the following steps.

(1) Amorphous alloy powder is sintered by spark plasma sintering to obtain bulk amorphous alloy samples.

(2) The part of the bulk amorphous alloy sample obtained in step (1) with temperature field that needs to be calibrated is cut into a number of amorphous alloy sub-blocks, and the position of each amorphous alloy sub-block in the bulk amorphous alloy sample is marked.

(3) The several amorphous alloy sub-blocks obtained in step (2) are respectively subjected to isothermal crystallization treatment at the same holding temperature to obtain the crystallization time of each amorphous alloy sub-block. The holding temperature is in the supercooled liquid region of the amorphous alloy.

(4) Annealing and isothermal crystallization are performed on the amorphous alloy powder used in the preparation of the bulk amorphous alloy sample at different annealing temperatures, so as to obtain the corresponding crystallization time of the amorphous alloy powder at different annealing temperatures, that is, to obtain the functional relationship between the annealing temperature and the crystallization time of the amorphous alloy powder. Moreover, in step (4), the holding temperature in performing isothermal crystallization on the amorphous alloy powder is the same as the holding temperature in performing isothermal crystallization on the amorphous alloy sub-block.

(5) The crystallization time of several amorphous alloy sub-blocks obtained in step (3) is substituted into the functional relationship between annealing temperature and crystallization time in step (4), then the temperature distribution of different amorphous alloy sub-blocks corresponding to different parts of the amorphous alloy block during the spark plasma heat preservation sintering process can be obtained.

The disclosure first uses a SPS (Spark Plasma Sintering) system to sinter the amorphous alloy powder into a bulk amorphous alloy sample, and cut out a series of small amorphous alloy samples at different positions inside the bulk amorphous alloy sample. Then, the cut small amorphous alloy samples are subjected to isothermal crystallization treatment to obtain the crystallization time of different parts inside the bulk amorphous alloy sample. In addition, an annealing-isothermal crystallization experiment was performed on the amorphous alloy powder used to prepare the amorphous alloy sintered sample, and the corresponding crystallization time at different annealing temperatures was obtained. Finally, by comparing the crystallization time of different parts inside the amorphous alloy sample obtained by isothermal crystallization, the temperature distribution of the different parts inside the amorphous alloy sample prepared by SPS in the temperature holding stage of the sintering process can be obtained. This method uses the unique thermal effect of amorphous alloys and the characteristics of being sensitive to thermal history to achieve accurate calibration of the internal temperature field. This method is simple and has high applicability, and the calibration process does not affect the original temperature field of the sample. The sintering temperature of any part inside the amorphous alloys sample prepared by SPS can be obtained. The method of the disclosure has a high level of conformity with the simulation result and high applicability.

In the disclosure, step (1) is specifically as follows: the amorphous alloy powder is placed in a sintering die, the amorphous alloy powder is pressed into a green body, and then placed in a spark plasma sintering furnace to be heated to a sintering temperature for temperature holding and sintering. The sintering temperature is in the supercooled liquid region of the amorphous alloy, the temperature is lowered to room temperature after the sintering is completed, and a bulk amorphous alloy sample is obtained. In some embodiments, the heating rate of step (1) is 50 to 150 K/min, and the temperature holding time is 3 to 10 min.

In some embodiments, step (1) is specifically as follows: the amorphous alloy powder is placed into a graphite die for sintering, and a layer of graphite paper is placed between the die and the amorphous alloy powder. A small hydraulic press is used to apply a pressure P to a die punch to compact-press the amorphous alloy powder into a green compact, the pressure P is in the range of 5 to 50 MPa. Then the graphite die with the amorphous alloy powder green compact is placed in the spark plasma sintering furnace and vacuumed. The vacuum degree is 1 to 105 Pa, and a protective atmosphere such as nitrogen and argon is introduced. The parameters for sintering process such as sintering temperature $T_s$, temperature holding time $t_s$, sintering pressure Ps, and heating rate are set. The sintering temperature $T_s$ should be in the supercooled liquid region $\Delta T$ of the amorphous alloy, the temperature holding time is 3 to 10 min, the sintering pressure is 10 to 200 MPa, and the heating rate is 50 to 150K/min. After the sintering is completed, the temperature will be cooled with the furnace, and the system will record the cooling rate, and finally sintering is performed to obtain the bulk amorphous alloy sample.

In step (1) of the disclosure, when preparing amorphous alloy samples during powder sintering using SPS, the sintering parameters should be set to ensure that the sintered samples are amorphous because the subsequent steps are designed based on the crystallization characteristics of the amorphous alloy. Therefore, in some embodiments, the sample sintered by SPS needs to undergo X-ray diffraction analysis to verify whether the sintered sample is amorphous.

In some embodiments of the disclosure, in a certain plane inside the bulk amorphous alloy sample sintered by SPS, a number of adjacent small amorphous alloy samples are cut in the form of an array, and the size of the small samples that are cut out must conform to the requirement of subsequent isothermal crystallization testing performed by differential scanning calorimeter (DSC). Generally the three-dimensional size of the amorphous alloy sub-block is no greater than 2 mm×2 mm×2 mm (that is, the length, width and height are no greater than 2 mm). The cutting method may include mechanical cutting such as cutting by using a saw, a diamond cutter; or using wire electrical discharge machining (WEDM). Finally, the cut samples are numbered to mark the position of each cut sample inside the bulk amorphous alloy sample.

Figure 3:
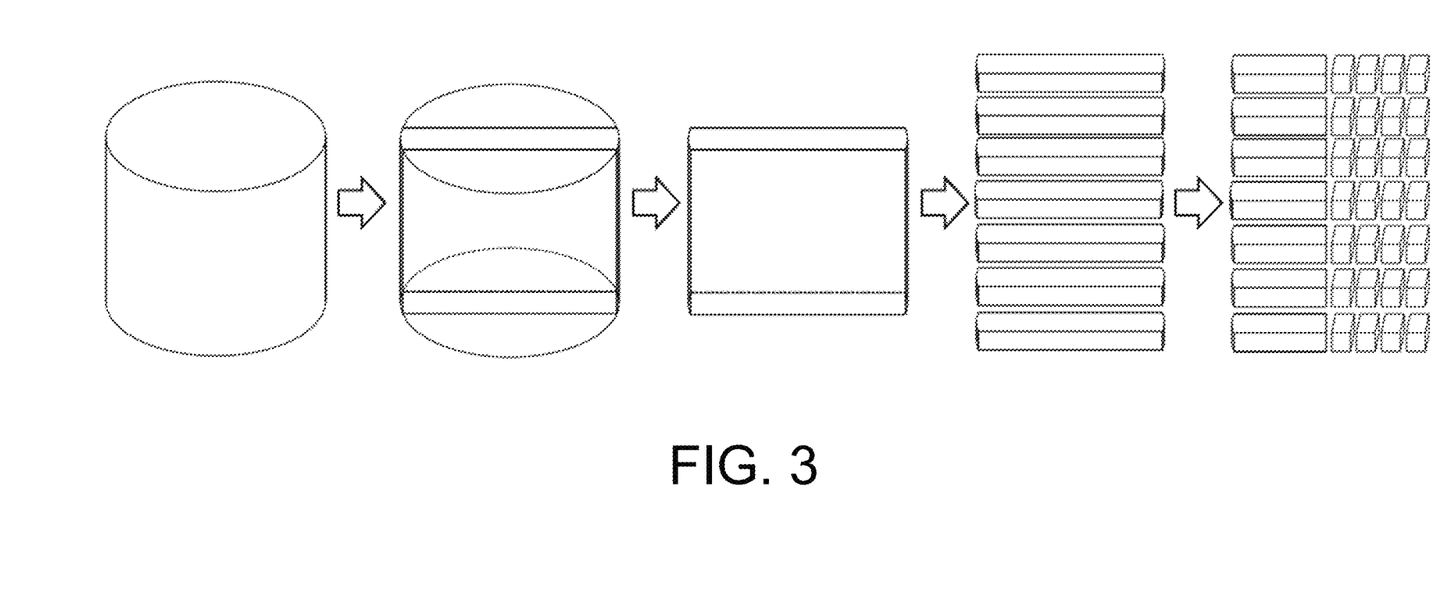
FIG. 3 is a cutting method used in a preferred embodiment of the disclosure.

In some embodiments, the bulk amorphous alloy obtained by sintering in step (1) is a cylindrical sample. Sampling by a precision cutting machine, first, a rectangular slice with a thickness of L is cut from the diameter of the cylindrical sample along the axial direction. Then the rectangular slice is cut into several long strip samples in the radial direction with the interval of L. Finally, a cube sample is cut out at the same interval of L in a radius length of each long strip sample. The dimension of the cube sample is L×L×L, the specific cutting process is shown in FIG. 3. Certainly, the cutting method and the cutting equipment used are not limited to the method and equipment described in this embodiment.

In step (3) of the disclosure, the plurality of amorphous alloy sub-blocks are respectively subjected to isothermal crystallization treatment according to the DSC principle to obtain the crystallization time of each amorphous alloy sub-block. In some embodiments, step (3) is specifically as follows. The several amorphous alloy sub-blocks cut in step (2) are respectively heated to the same holding temperature $T_{holding\ temperature}$, and kept at the holding temperature until the amorphous alloy sub-blocks are completely crystallized, and a number of isothermal DSC heat flow curves corresponding to the plurality of amorphous alloy sub-blocks at the holding temperature are obtained. Each heat flow curve is used to obtain the initial crystallization time of each amorphous alloy sub-block as its crystallization time. The holding temperature $T_{holding\ temperature}$ is in the supercooled liquid region $\Delta T$ of the amorphous alloy. The supercooled liquid region $\Delta T=T_x-T_g$, $T_x$ is the crystallization temperature, and $T_g$ is the glass transition temperature of the amorphous alloy material.

In step (3) of the disclosure, the amorphous alloy sub-blocks cut in step (2) are subjected to isothermal crystallization treatment, and the specific treatment process is as follows. The temperature is ascended rapidly to the set holding temperature $T_{holding\ temperature}$ at a heating rate of 50 to 300K/min, and the temperature is kept until the amorphous alloy sample is completely crystallized. The holding temperature $T_{holding\ temperature}$ should be in the supercooled liquid region $\Delta T$ of the amorphous alloy. The range and height of the supercooled liquid region $\Delta T$ are related to the type of adopted amorphous alloy. Through the above experiments, the isothermal DSC heat flow curves of the sub-blocks at different positions inside the amorphous alloy sample are obtained.

In some embodiments, the initial crystallization time $t_{crystallization}$ is calibrated on the DSC heat flow curve by using the double tangent method, and the method is specifically as follows. Tangents are made respectively at the smooth baseline on the heat flow curve where crystallization has not occurred yet and at the descending part of the crystallization peak at the beginning of crystallization. The time corresponding to the intersection of the two tangents is the initial crystallization time $t_{crystallization}$, and finally the initial crystallization time $t_{crystallization}$ of each amorphous alloy sub-block at different positions inside the amorphous alloy sample is obtained.

In some embodiments, other standards or methods can be adopted to determine the crystallization time of the amorphous alloy sample from the heat flow curve, such as using the double tangent method to obtain the crystallization end time, or using other methods such as the baseline separation point method to obtain the crystallization time and so on. Even the time corresponding to the crystallization peak value (the crystallization time corresponding to the crystallization degree of about 50%) can be directly taken as the standard for comparing with calibration.

The annealing-isothermal crystallization experiment in step (4) of the disclosure specifically includes two stages.

Annealing is performed first, followed by isothermal crystallization. The annealing stage is mainly to analogize the temperature change process of the SPS process under different holding temperatures. The temperature changes are as follows. First, the temperature is increased to the annealing temperature $T_{annealing}$ according to the heating rate of SPS in step (1). The annealing temperature $T_{annealing}$ is set to a series of temperature values within a certain range close to the sintering temperature $T_s$ and above. The range is set depending on the temperature difference between the die temperature and the center temperature of sample during the temperature holding stage in SPS preparation of this type of amorphous alloy. The temperature range can be obtained through study of literature or numerical simulation. Annealing time $t_{annealing}$ is consistent with the temperature holding time $t_s$ of step (1). After annealing is completed, the temperature begins to drop, and the cooling rate is the same as the cooling rate after temperature holding is completed in the sintering in step (1). After the temperature is cooled to room temperature, the process enters the isothermal crystallization stage, and the specific process of isothermal crystallization stage is consistent with the requirements of the isothermal crystallization treatment in step (3). The temperature is quickly increased to the same holding temperature as in step (3) at a heating rate of 50 to 300 K/min, and the temperature is kept until the amorphous alloy sample is completely crystallized. Finally the isothermal DSC heat flow curve corresponding to different annealing temperature $T_{annealing}$ is obtained. The initial crystallization time $t'_{crystallization}$ is also calibrated by using the double tangent method, and the initial crystallization time $t'_{crystallization}$ corresponding to different annealing temperature $T_{annealing}$ is obtained.

In some embodiments, step (4) includes the following sub-steps:

(4-1) The amorphous alloy powder is heated to the annealing temperature at the heating rate of the SPS described in step (1), and then holds the temperature. The temperature holding time is the same as the temperature holding time of the SPS described in step (1). Cooling is performed after annealing is completed, and the cooling rate is the same as the cooling rate after the SPS in step (1). The annealing temperature is within the supercooled liquid region of the amorphous alloy.

(4-2) After the temperature is lowered to a value below 100° C., the amorphous alloy is subjected to isothermal crystallization treatment, and the holding temperature for isothermal crystallization is the same as the holding temperature for isothermal crystallization of the amorphous alloy sub-block described in step (3). The temperature is kept until the amorphous alloy is completely crystallized, and the corresponding crystallization time at the annealing temperature is obtained.

(4-3) The annealing temperature is changed within the supercooled liquid region of the amorphous alloy, steps (4-1) and (4-2) are repeated to obtain the corresponding crystallization time at different annealing temperatures, that is, the functional relationship between annealing temperature and crystallization time of the amorphous alloy powder is obtained.

In step (4) of the disclosure, the amorphous alloy powder is annealed at a series of annealing temperatures and then isothermally crystallized. The annealing process is analogous to the thermal history (heating process) of the sintering process of the bulk amorphous alloy in step (1). Therefore, the heating rate, temperature holding time and cooling rate are preferably the same as the sintering process of the bulk amorphous alloy in step (1). In step (4), the holding temperature for isothermal crystallization of the amorphous alloy powder is the same as the holding temperature for isothermal crystallization of the amorphous alloy sub-block in step (3). In this manner, when substituting the crystallization time of several amorphous alloy sub-blocks obtained in step (2) into the annealing temperature-crystallization time function to solve the sintering temperature of the amorphous alloy sub-blocks, the accuracy and rationality can be ensured.

In some embodiments, the crystallization time data corresponding to different annealing temperatures obtained in step (4-3) are nonlinearly fitted to obtain the functional relationship between the annealing temperature and the crystallization time.

In step (5) of the disclosure, when calibrating the temperature field of SPS sintered amorphous alloy, firstly, the initial crystallization time $t'_{crystallization}$ corresponding to a series of different annealing temperatures $T_{annealing}$ obtained in step (4) is fitted through a nonlinear curve. Then the relationship curve between annealing temperature $T_{annealing}$ and initial crystallization time $t'_{crystallization}$ is obtained, and compared with the initial crystallization time $t_{crystallization}$ of different parts inside the amorphous alloy sample obtained in step (3), the temperature field distribution of different parts of the sample during the temperature holding stage in the sintering process can be obtained.

In some embodiments, when preparing amorphous alloy samples by SPS, the samples should be taken out of the sintering furnace for air cooling when the temperature drops to about 100° C. The cooling rate at this stage depends on other external environmental conditions such as air temperature or air flow. The cooling rate is almost uncontrollable. According to the principle of the disclosure, for the annealing-isothermal crystallization experiment using DSC, the cooling rate in the annealing stage should be consistent with the cooling rate during SPS and sample preparation. The cooling rate for the part with high temperature above 100° C. can be easily controlled, which can ensure that the cooling rate is basically the same as the cooling rate during SPS. However, when the temperature drops to a value below 100° C., it is difficult to ensure that the cooling rate is consistent with the uncontrollable cooling rate during SPS, and the cooling rate controlled by DSC itself will become slower. Under the circumstances, the cooling rate is almost impossible to keep the same with the cooling rate of SPS. Based on the above, when the temperature drops to a value below 100° C., the temperature change at low temperature has no effect on the crystallization time of the amorphous alloy. In order to simplify the experiment process, the part of cooling temperature to a value below 100° C. is eliminated from some embodiments, after annealing is completed and the temperature drops to 100° C., the temperature starts to rise directly and the process enters the isothermal crystallization stage.

The following is an example.

Figure 1:
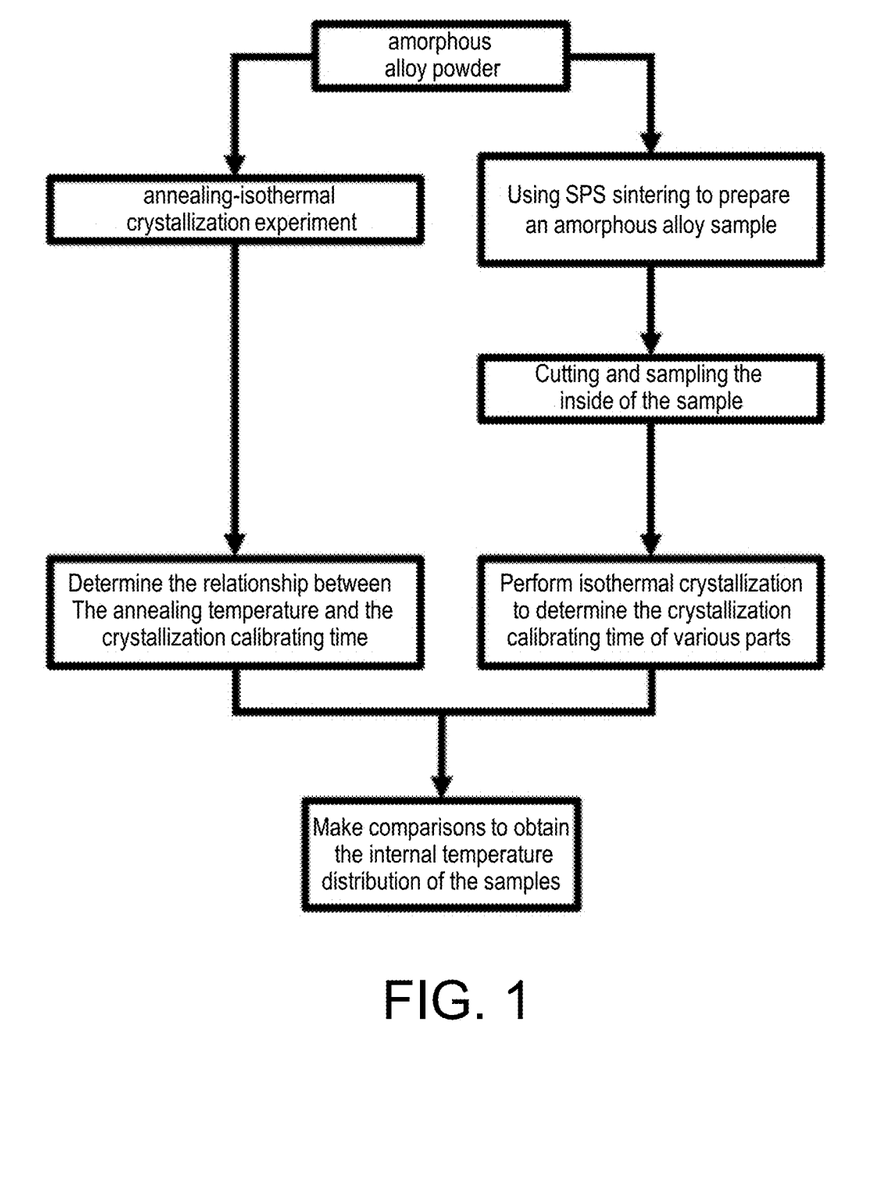
FIG. 1 is a flowchart of a method for studying the internal temperature field of amorphous alloy prepared by SPS provided by the disclosure.

FIG. 1 is a flow chart of the calibration experiment of the internal temperature field of an amorphous alloy prepared by SPS according to the disclosure, including the following steps.

Figure 2:
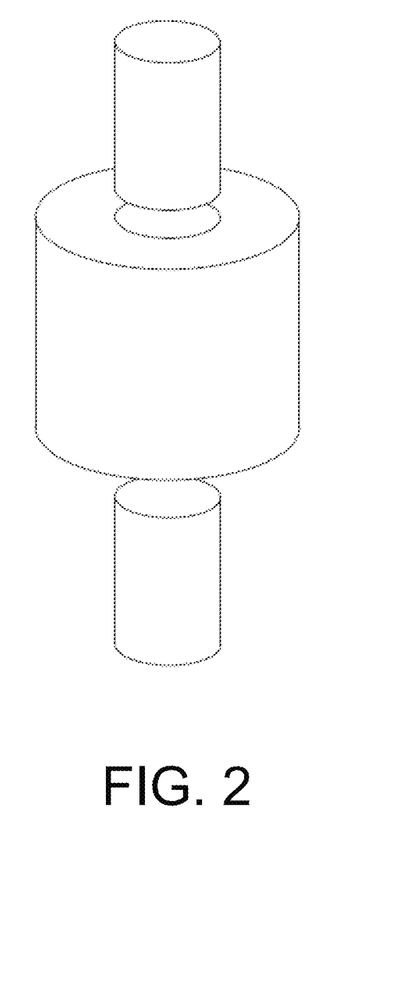
FIG. 2 is an SPS sintered graphite die used in a preferred embodiment of the disclosure.

(1) This example uses a sintering system (model: LABOX-1575) manufactured by SINTER LAND of Japan. The adopted amorphous alloy powder is amorphous alloy powder ($Zr_{55}Cu_{30}Al_{10}Ni_5$) with a fineness of 100 to 150 μm. The amorphous alloy powder is analyzed as amorphous by XRD. DSC analysis showed that the glass transition temperature $T_g$ of the amorphous alloy powder was 405° C., the crystallization temperature $T_x$ was 487° C., and the supercooled liquid region $\Delta T$ ($\Delta T=T_x-T_g$) was 82° C. The amorphous alloy powder ($Zr_{55}Cu_{30}Al_{10}Ni_5$) was placed into the graphite cylindrical die for sintering. The schematic diagram of the graphite die is shown in FIG. 2 below. There is a layer of graphite paper between the die and the amorphous alloy powder. A small hydraulic press is used to apply a pressure of 20 MPa to a die punch to compact-press the amorphous alloy powder into a cold green compact. Then the graphite die with the amorphous alloy powder green compact was put into the SPS furnace, and vacuumed to less than 10 Pa. A nitrogen protective atmosphere was introduced, and parameters for the sintering process were set as follows. The sintering temperature $T_s$ was 425° C., the temperature holding time $t_s$ was 5 min, the sintering pressure $P_s$ was 50 MPa, and the heating rate was 50K/min. After the sintering process, a cylindrical amorphous alloy sample with a diameter d of 20 mm and a height h of 15 mm was obtained. The amorphous alloy sample was analyzed as amorphous by XRD. After sintering, the temperature change curve obtained by the system shows that the cooling rate was about 65K/min.

(2) The sample required for the subsequent DSC test is a 2×2×2 mm cube amorphous alloy block. Therefore, the following cutting steps are performed through precision cutting. First, a rectangle slice with a thickness of 2 mm is cut from the diameter of the cylindrical sample along the axial direction. Then the rectangular slice is cut into several long strip samples in the radial direction with the interval of 2 mm. Finally, a cube sample with a dimension of 2×2×2 mm is cut out at the same interval of 2 mm in a radius length of each long strip sample. Finally, each cube sample that is cut out is numbered to mark the position of each sample inside the cylindrical sample. The specific cutting process is shown in FIG. 3. In this embodiment, a total of 28 amorphous alloy cube samples are cut out in 7 layers and 4 in each layer. The temperature field distribution of the samples during SPS is almost the same from top to bottom. Therefore, in order to simplify the experimental process of the disclosure, in this example, 16 amorphous alloy cube samples (the sample numbers are 4-1, 4-2, 4-3, 4-4, 5-1, 5-2, 5-3, 5-4, 6-1, 6-2, 6-3, 6-4, 7-1, 7-2, 7-3 and 7-4) in the 4th, the 5th, the 6th and the 7th layers at the lower half part of the sample were taken to perform the isothermal crystallization experiment in step (3).

Figure 4:
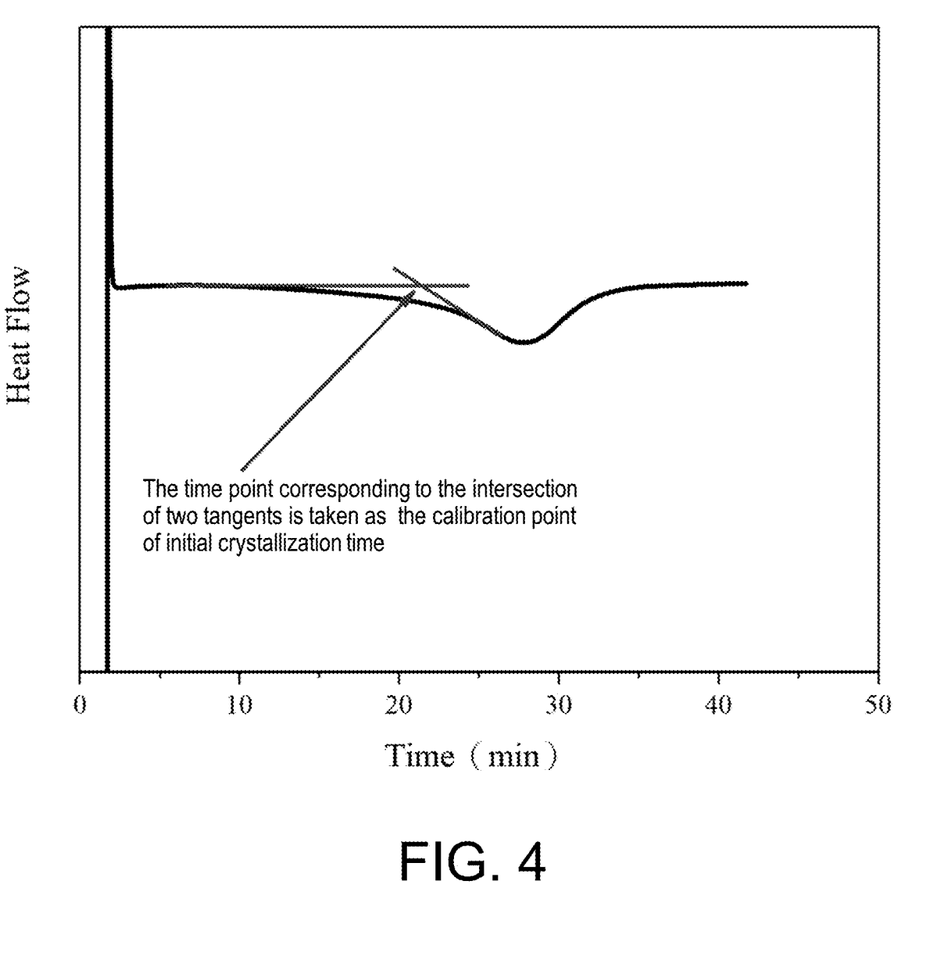
FIG. 4 is a schematic diagram of a method for determining the initial crystallization time on the isothermal DSC heat flow curve by using a double tangent method according to a preferred embodiment of the disclosure.
Figure 5:
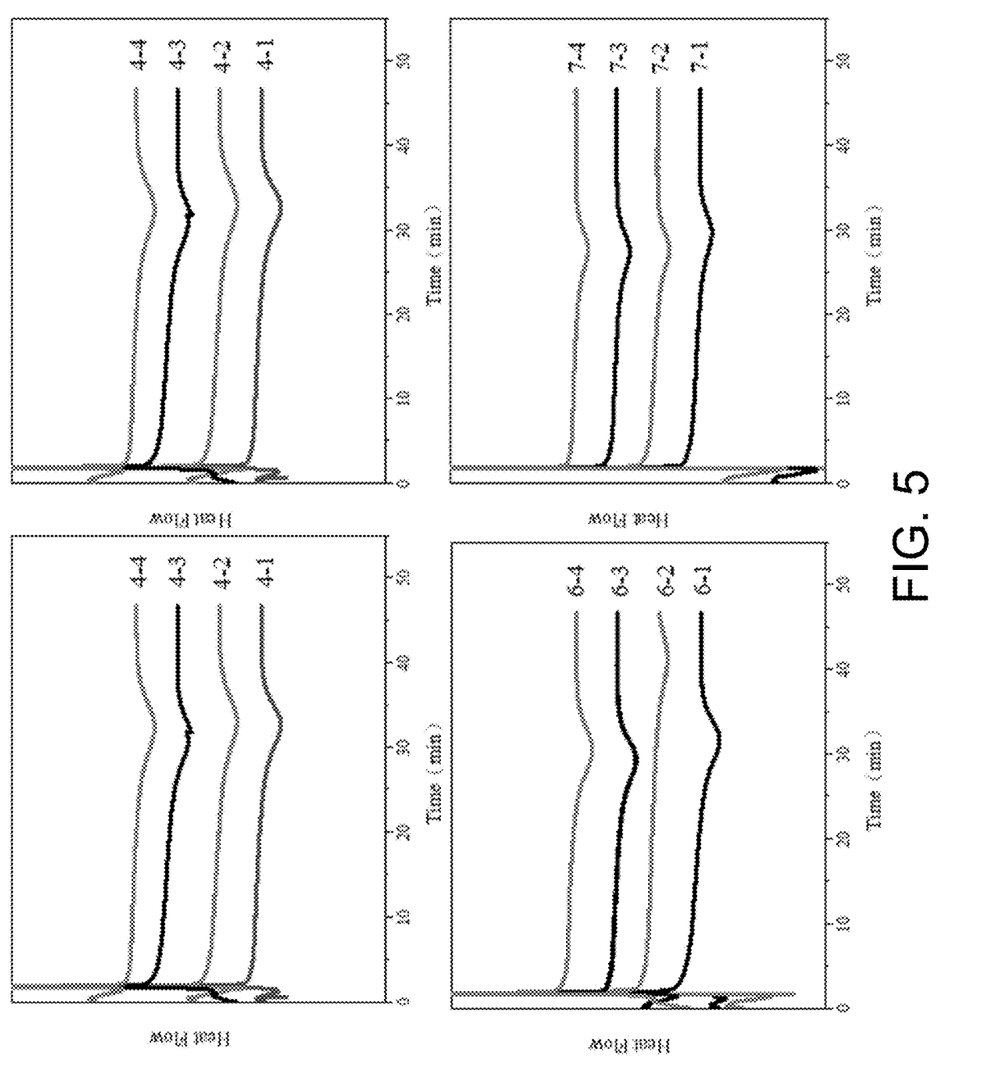
FIG. 5 is a heat flow curve of each part of the lower half of the amorphous alloy prepared by SPS according to a preferred embodiment of the disclosure.

(3) An isothermal DSC experiment was carried out on the amorphous alloy cube samples cut at different positions inside the amorphous alloy sample in step (2), and the samples were heated up to the holding temperature $T_{holding\ temperature}$ at a heating rate of 200K/min. The holding temperature $T_{holding\ temperature}$ of this embodiment was kept at 445° C. for 45 minutes. A time point at which the temperature was raised to 100° C. is taken as the zero time point, and the heat flow curve after that time point was obtained. Then the initial crystallization time $t_{crystallization}$ was calibrated on the heat flow curve using the double tangent method, the process is specifically as follows. Tangents were made respectively at the smooth baseline on the heat flow curve where crystallization has not occurred yet and at the descending part of the crystallization peak at the beginning of crystallization. The time corresponding to the intersection of the two tangents is the initial crystallization time $t_{crystallization}$. The double tangent method calibration method is shown in FIG. 4 below. Finally, the initial crystallization time $t_{crystallization}$ at different positions inside the amorphous alloy sample was obtained. In this embodiment, the heat flow curves of the obtained 16 samples (the sample numbers are 4-1, 4-2, 4-3, 4-4, 5-1, 5-2, 5-3, 5-4, 6-1, 6-2, 6-3, 6-4, 7-1, 7-2, 7-3 and 7-4) are shown in FIG. 5. The initial crystallization time $t_{crystallization}$ of each sample obtained by the double tangent method is shown in Table 1. The value of initial crystallization time of the small sample of amorphous alloy cube numbered 6-2 of the sixth layer is suspected to be too high due to experimental errors. Since the value does not comply with the law, it is not included in research on the temperature field in step (5).

TABLE 1

Initial crystallization time of each part at the lower half of the amorphous alloy prepared in Example 1

| $4^{th}$ layer | Sample number | 4-1 | 4-2 | 4-3 | 4-4 |
|---|---|---|---|---|---|
| | Crystallization time | 25.22 s | 25.32 s | 26.56 s | 26.57 s |
| $5^{th}$ layer | Sample number | 5-1 | 5-2 | 5-3 | 5-4 |
| | Crystallization time | 24.43 s | 24.45 s | 25.40 s | 26.15 s |
| $6^{th}$ layer | Sample number | 6-1 | 6-2 | 6-3 | 6-4 |
| | Crystallization time | 23.92 s | 23.98 s | 34.41 s | 26.15 s |
| $7^{th}$ layer | Sample number | 7-1 | 7-2 | 7-3 | 7-4 |
| | Crystallization time | 22.33 s | 22.33 s | 22.93 s | 24.32 s |

(4) The annealing-isothermal crystallization experiment was carried out still by using amorphous alloy powder ($Zr_{55}Cu_{30}Al_{10}Ni_5$) used in SPS by using DSC equipment. The details are as follows. First, the temperature was heated to the annealing temperature $T_{annealing}$ at a heating rate of 50 K/min of SPS in step (1). The range of annealing temperature $T_{annealing}$ was set to a series of temperature points within a certain range close to the sintering temperature $T_s$ and above. In this embodiment, the sintering temperature $T_s$ was 425° C., so the annealing temperature $T_{annealing}$ was set to 410° C., 415° C., 420° C., 425° C., 430° C., 435° C., 440° C., 445° C., 450° C., 455° C., 460° C., 465° C., and 470° C. The annealing time $t_{annealing}$ was set to 5 min, which is consistent with the temperature holding time $t_s$ of SPS in step (1). After annealing was completed, the temperature began to drop; the cooling rate was 65 K/min, which is consistent with the cooling rate of SPS in step (1). After the temperature was cooled to 100° C., the process entered the isothermal crystallization stage. The temperature change in this stage is the same as that of the isothermal crystallization treatment in step (3). The temperature was heated to 445° C. at a heating rate of 200 K/min and kept for 45 minutes to obtain the heat flow curve corresponding to each annealing temperature. To ensure the accuracy of the experiment, experiments were carried out three times repeatedly for each annealing temperature. After the annealing stage was over, the time point at which the temperature was lowered to 100° C. and started to rise was taken as the zero time point. The isothermal DSC heat flow curve after this time point was taken, and the double tangent method was also used to obtain the initial crystallization time. The three initial crystallization times obtained through three repetitive experiments for each annealing temperature were averaged and the average value was used as the final initial crystallization time $t'_{crystallization}$ corresponding to the annealing temperature.

Figure 6:
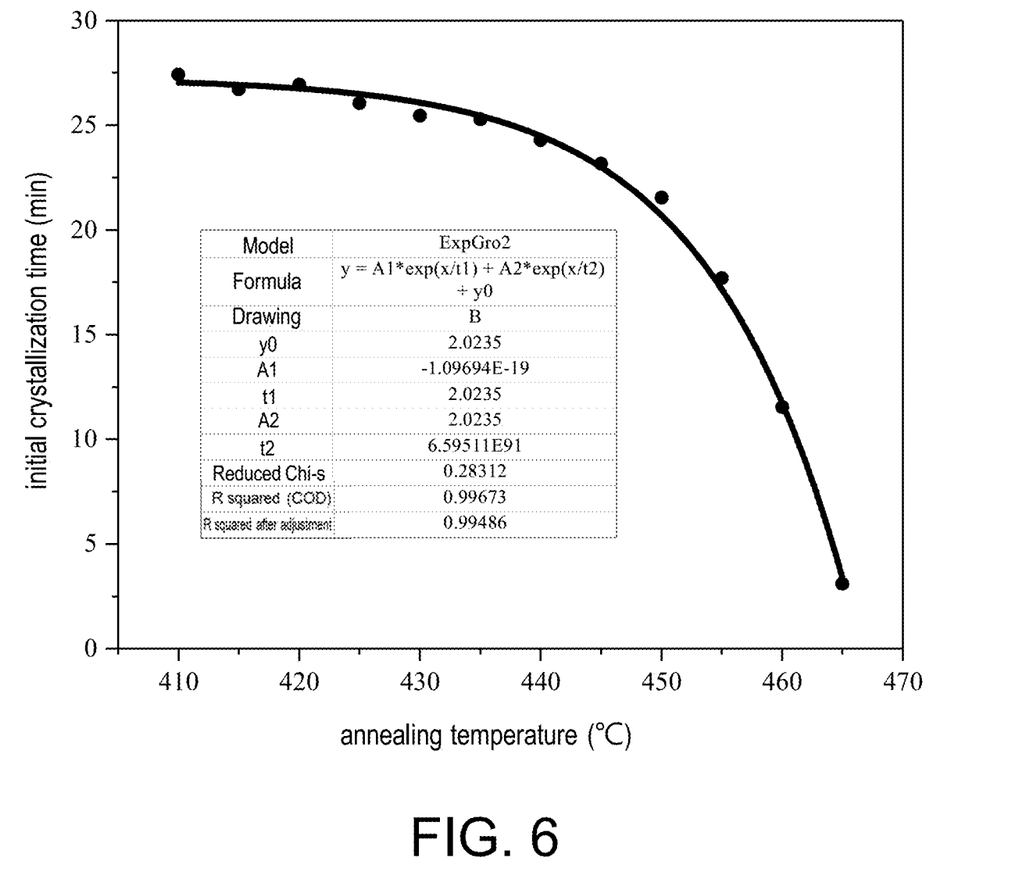
FIG. 6 is a curve of the relationship between annealing temperature and initial crystallization time obtained by fitting according to a preferred embodiment of the disclosure.
Figure 7:
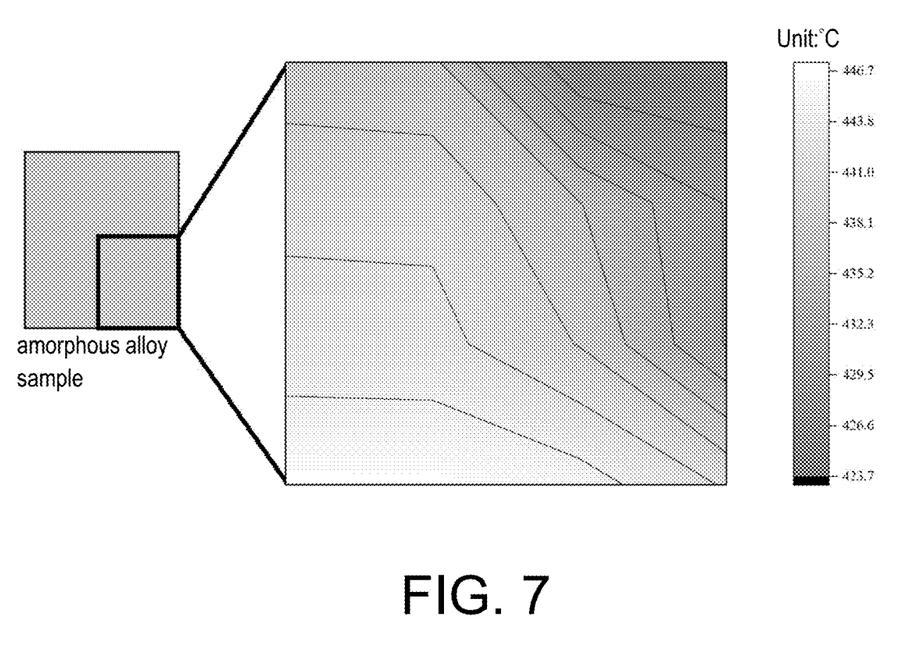
FIG. 7 is a contour plot of the temperature distribution of the lower half of the amorphous alloy prepared by SPS according to a preferred embodiment of the disclosure.

(5) Nonlinear curve fitting is performed on the initial crystallization time $t'_{crystallization}$ corresponding to a series of different annealing temperatures $T_{annealing}$ obtained in step (4), as shown in FIG. 6 below, to obtain the relationship curve between the annealing temperature $T_{annealing}$ and the initial crystallization time $t'_{crystallization}$. Compared with the initial crystallization time $t_{crystallization}$ at different parts inside the amorphous alloy sample obtained in step (3), as shown in Table 2, the temperature field distribution of the lower half part of the sample at the temperature holding stage in the sintering process is obtained. The contour plot of temperature distribution is constructed as shown in FIG. 7 below. It can be seen that the temperature field distribution inside the amorphous alloy prepared by SPS is high in the center and low at the edge in the radial direction. In the axial direction, the temperature field distribution is low in the center and high at the edge. The highest temperature point appears at the center at the end in axial direction of the sample; the lowest temperature point appears at the edge in radial direction in the center of the sample. It is in good agreement with the existing numerical simulation results of temperature field in SPS.

TABLE 2

Sintering temperature of each part of the lower half of the amorphous alloy prepared in Example 1

| | Sample number | | | | |
|---|---|---|---|---|---|
| 4<sup>th</sup> layer | Sample number | 4-1 | 4-2 | 4-3 | 4-4 |
| | Sintering temperature | 426.42° C. | 435.82° C. | 423.80° C. | 423.78° C. |
| 5<sup>th</sup> layer | Sample number | 5-1 | 5-2 | 5-3 | 5-4 |
| | Sintering temperature | 440.24° C. | 440.15° C. | 435.31° C. | 429.29° C. |
| 6<sup>th</sup> layer | Sample number | 6-1 | 6-2 | 6-3 | 6-4 |
| | Sintering temperature | 442.14° C. | 441.93° C. | ~ | 429.25° C. |
| 7<sup>th</sup> layer | Sample number | 7-1 | 7-2 | 7-3 | 7-4 |
| | Sintering temperature | 446.69° C. | 446.68° C. | 445.18° C. | 440.65° C. |

Those skilled in the art can easily understand that the above are only the preferred embodiments of the present disclosure and are not intended to limit the present disclosure. Any modification, equivalent replacement and improvement, etc. made within the spirit and principle of the present disclosure should fall within the scope to be protected by the present disclosure.

What is claimed is:

1. A method for calibrating an internal temperature field of an amorphous alloy prepared by spark plasma sintering (SPS), comprising the following steps:
   (1) sintering an amorphous alloy powder by the SPS to obtain a bulk amorphous alloy sample;
   (2) cutting a part of the bulk amorphous alloy sample obtained in step (1) into a number of amorphous alloy sub-blocks, and marking a position of each of the amorphous alloy sub-blocks in the bulk amorphous alloy sample, wherein the part of the bulk amorphous alloy sample is where a temperature field needs to be calibrated;
   (3) performing a first isothermal crystallization treatment on each of the amorphous alloy sub-blocks obtained in step (2) respectively at a same holding temperature to obtain a crystallization time of each of the amorphous alloy sub-blocks, wherein the holding temperature is in a supercooled liquid region of the amorphous alloy sub-blocks;
   (4) performing an annealing treatment and a second isothermal crystallization treatment on an amorphous alloy powder material, which is the same as the amorphous alloy powder used in preparation of the bulk amorphous alloy sample, at different annealing temperatures, so as to obtain a corresponding crystallization time of the amorphous alloy powder material at the different annealing temperatures, and a functional relationship between the annealing temperature and the crystallization time of the amorphous alloy powder material, wherein in step (4), a holding temperature in performing the second isothermal crystallization treatment on the amorphous alloy powder material is the same as the holding temperature in performing the first isothermal crystallization treatment on the amorphous alloy sub-blocks in step (3);
   (5) substituting the crystallization times of the amorphous alloy sub-blocks obtained in step (3) into the functional relationship between the annealing temperature and the crystallization time in step (4), thereby obtaining a temperature distribution of the different amorphous alloy sub-blocks corresponding to different positions inside the bulk amorphous alloy sample during the SPS.

2. The calibration method according to claim 1, wherein step (1) comprises: placing the amorphous alloy powder in a sintering die; pressing the amorphous alloy powder into a green body; then heating to a sintering temperature for performing temperature holding and sintering in a SPS furnace, wherein the sintering temperature is in the supercooled liquid region of the amorphous alloy powder; lowering the temperature to a room temperature after the sintering is completed, and obtaining the bulk amorphous alloy sample.

3. The calibration method according to claim 2, wherein a heating rate for the heating is 50 to 150 K/min, and a temperature holding time for the temperature holding is 3 to 10 minutes.

4. The calibration method according to claim 1, wherein step (2) adopts mechanical cutting or wire electrical discharge machining (WEDM), and a three-dimensional size of the amorphous alloy sub-block is no greater than 2 mm×2 mm×2 mm.

5. The calibration method according to claim 1, wherein in step (3), the amorphous alloy sub-blocks are respectively subjected to the first isothermal crystallization treatment according to a differential scanning calorimeter (DCS) principle to obtain the crystallization time of each of the amorphous alloy sub-blocks.

6. The calibration method according to claim 5, wherein step (3) comprises: heating the amorphous alloy sub-blocks cut in step (2) to the same holding temperature respectively; keeping the amorphous alloy sub-blocks at the holding temperature until the amorphous alloy sub-blocks are completely crystallized, obtaining a number of isothermal DSC heat flow curves corresponding to the amorphous alloy sub-blocks at the holding temperature; obtaining an initial crystallization time of each of the amorphous alloy sub-blocks as its crystallization time by each of the heat flow curves.

7. The calibration method according to claim 6, wherein the initial crystallization time is calibrated on the DSC heat flow curve by using a double tangent method, and the double tangent method comprises: making tangents at a smooth baseline on the heat flow curve where crystallization has not occurred yet and at a descending part of a crystallization peak at the beginning of the crystallization respectively; a time corresponding to an intersection of the two tangents being the initial crystallization time; and finally obtaining the initial crystallization time of each of the amorphous alloy sub-blocks at the different positions inside the bulk amorphous alloy sample, wherein the initial crystallization time is taken as its crystallization time.

8. The calibration method according to claim 1, wherein in step (3), a differential scanning calorimeter is used to perform the first isothermal crystallization treatment on the amorphous alloy sub-blocks.

9. The calibration method according to claim 1, wherein step (4) comprises the following sub-steps:
  (4-1) heating the amorphous alloy powder material to an annealing temperature at a heating rate the same as that of the SPS in step (1) and holding the temperature, wherein a temperature holding time is the same as that of the SPS in step (1); and cooling after the annealing treatment, wherein a cooling rate is the same as that after the SPS in step (1) and the annealing temperature is in the supercooled liquid region of the amorphous alloy powder material;
  (4-2) after the temperature is lowered to a value below 100° C., subjecting the obtained amorphous alloy powder material to the second isothermal crystallization treatment, wherein the holding temperature in performing the second isothermal crystallization treatment is the same as the holding temperature in performing the first isothermal crystallization treatment on the amorphous alloy sub-blocks in step (3); holding the temperature until the amorphous alloy powder material is completely crystallized; and obtaining the corresponding crystallization time at the annealing temperature;
  (4-3) changing the annealing temperature within the supercooled liquid region of the amorphous alloy powder material, and repeating steps (4-1) and (4-2) to obtain the corresponding crystallization times at the different annealing temperatures, that is, to obtain the functional relationship between the annealing temperature and the crystallization time of the amorphous alloy powder material.

10. The calibration method according to claim 9, wherein the crystallization time data corresponding to the different annealing temperatures obtained in step (4-3) is nonlinearly fitted to obtain the functional relationship between the annealing temperature and the crystallization time.

* * * * *